Figure 1:
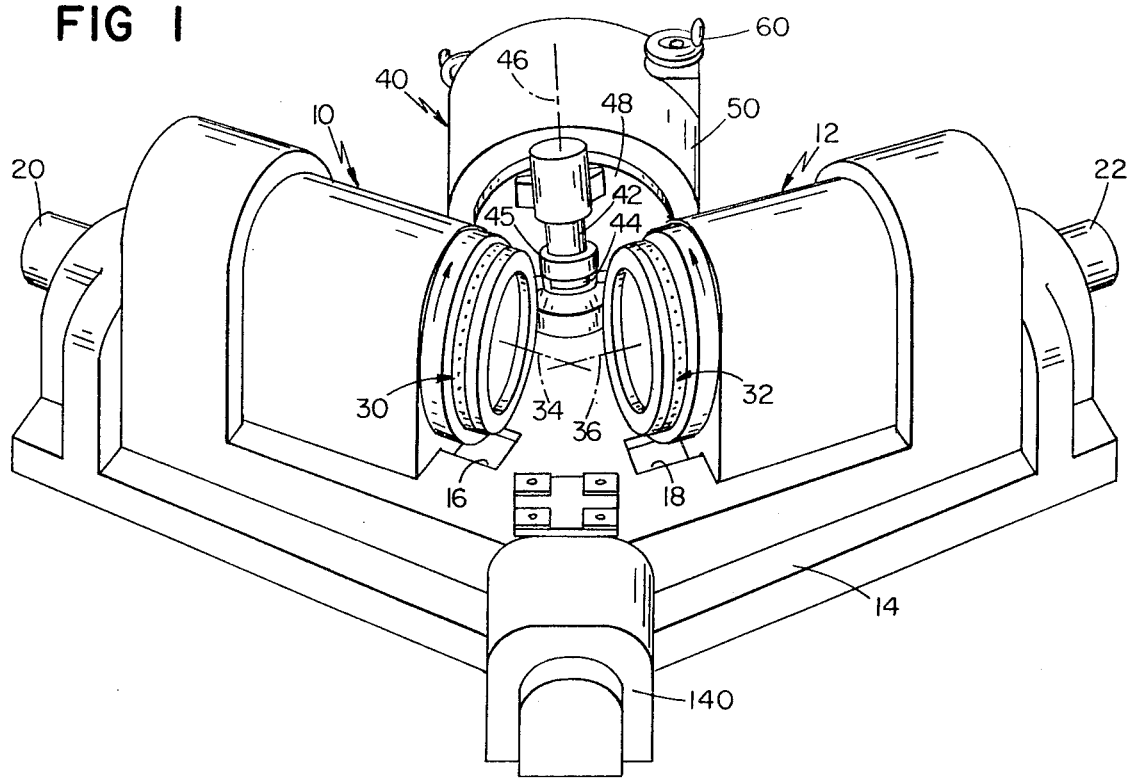

United States Patent
Maker

[15] 3,662,650
[45] May 16, 1972

[54] GEAR MAKING

[72] Inventor: Paul Maker, Marion, Mass.
[73] Assignee: Bird Island, Inc., Boston, Mass.
[22] Filed: Feb. 16, 1970
[21] Appl. No.: 11,503

[52] U.S. Cl. ................................................90/3, 29/105 R
[51] Int. Cl. ..........................................................B23f 5/20
[58] Field of Search..............................90/3, 4, 6, 9.6, 1, 9

[56] References Cited

UNITED STATES PATENTS

| | | | |
|---|---|---|---|
| 1,516,524 | 11/1924 | Fellows........................................90/3 |
| 1,877,104 | 9/1932 | Wildhaber..............................29/103 |
| 1,983,019 | 12/1934 | De Leeum..................................90/3 |
| 2,315,068 | 3/1943 | Matthews....................................90/4 |

*Primary Examiner*—Gil Weidenfeld
*Attorney*—Robert E. Hillman

[57] ABSTRACT

Apparatus for making gears, featuring a workpiece support mounted to provide rotation of the workpiece about its axis at a basic rate; a cutter having profile generating cutting edges mounted for rotation about a cutter axis at a basic rate bearing a ratio to the basic workpiece rate dependent upon the ratio of the number of profiles being generated to the number of profile generating cutting edges in the cutter, the cutter axis being at an angle to the workpiece axis which differs from 90° by an angle other than the helix angle (taken at the generating circle) of the gear being made, the cutter and workpiece being mounted for relative translation axially of the workpiece; and an element responsive to that relative translation to add to or subtract from the basic workpiece rate a rate of rotation to which the rate of translation bears a ratio equal to the desired lead of the gear being made; whereby successive cuts made in each toothspace are tangent to the adjacent profile at lines oblique to the workpiece axis and extending generally between the fillet and tip of the profile, and between successive cuts tangent to any one desired profile there will intervene a complete revolution of the workpiece.

15 Claims, 15 Drawing Figures 3,662,650

SHEET 1 OF 4

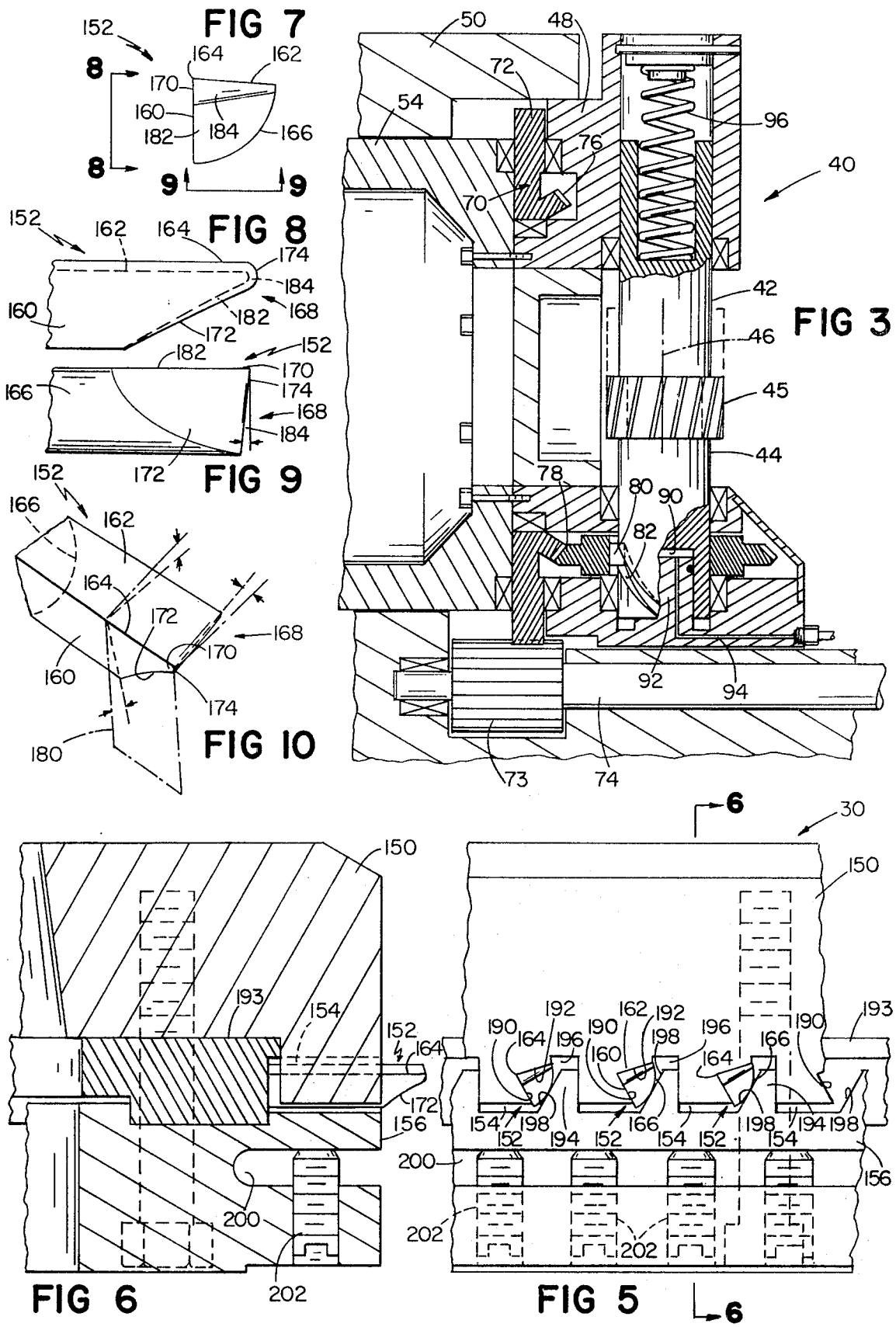

GEAR MAKING

This invention relates to making gears with apparatus of the general type disclosed in pending U.S. Pat. application Ser. No. 844,925, filed by Paul Maker on July 25, 1969, now U.S. Pat. No. 3,595,130.

Objects of the invention are to provide for high speed, high quality gear making, using a rotary cutter, and continuously indexing the workpiece; yet making possible the production of gears of any desired helix angle, with straight roots, and with highly accurate tooth profiles of any of a wide variety of shapes finished to a uniform depth over the entirety of an arbitrarily large face width. Other objects are to provide in a simple and reliable manner for accurate location of cutting tools in the cutter, so that variation in tool dimensions (e.g., due to sharpening) will not affect cutting edge position.

The invention features a workpiece support mounted to provide rotation of the workpiece about its axis at a basic rate; a cutter having profile generating cutting edges mounted for rotation about a cutter axis at a basic rate bearing a ratio to the basic workpiece rate dependent upon the ratio of the number of profiles being generated to the number of profile generating cutting edges in the cutter, the cutter axis being at an angle to the workpiece axis which differs from 90° by an angle other than the helix angle (taken at the generating circle) of the gear being made, the cutter and workpiece being mounted for relative translation axially of the workpiece; and an element responsive to that relative translation to add to or subtract from one of the basic rates a differential rate of rotation to which the rate of translation bears a ratio dependent upon the desired lead of the gear being made; whereby successive cuts made in each toothspace are tangent to the adjacent profile at lines oblique to the workpiece axis and extending generally between the fillet and tip of the profile, and between successive cuts tangent to any one desired profile there will intervene a complete revolution of the workpiece. In preferred embodiments the differential rate is added to or subtracted from the basic rate of the workpiece, and its ratio with the rate of translation is equal to the desired lead; the successive cuts are tangent to the profile at lines oblique to the workpiece axis; the profile generating cutting edges lie in a single surface of revolution, and are linear when involute profiles are desired and non-linear otherwise, the relative translation extending sufficiently to cause the entire workpiece to effectively move axially past the plane of deepest penetration of the cutter into the workpiece; the cutter has a tool-holding body with removable tools arranged so that the cutting edges are spaced uniformly around the periphery of the body; a second cutter is constructed and disposed in a manner analagous to the first cutter for generating profiles on the opposite sides of the teeth from the profiles generated by the first cutter, the two cutter axes being coplanar but non-parallel to each other, the cutters being mounted for translation along their respective axes toward the workpiece axis; the cutter and workpiece are mounted additionally for relative translation along a path non-parallel to the workpiece axis, the basic rate of rotation of the cutter or of the workpiece being changed, upon occurrence of the last mentioned relative translation, by a differential rate dependent upon the rate of the translation, so that for each desired tooth profile the profile generating edges will make a series of cuts respectively adjacent to but not intersecting the desired profile, the passes of the profile generating edges being tangent to an imaginary continuation above the workpiece of the desired profile, a complete revolution of the workpiece intervening between successive ones of the last mentioned cuts adjacent to any one desired profile; and the apparatus has an infeed mode during which only the relative translation non-parallel to the workpiece axis occurs, and an axial feed mode during which only the translation axially of the workpiece occurs, profile generation occuring during the axial feed mode at the intersection of a surface of action tangent to the generating circle with the path of the profile generating edges, the cutter axes being located relative to the workpiece during the infeed mode so that the surface of action is not intersected within the workpiece by the cutters.

Figure 4:
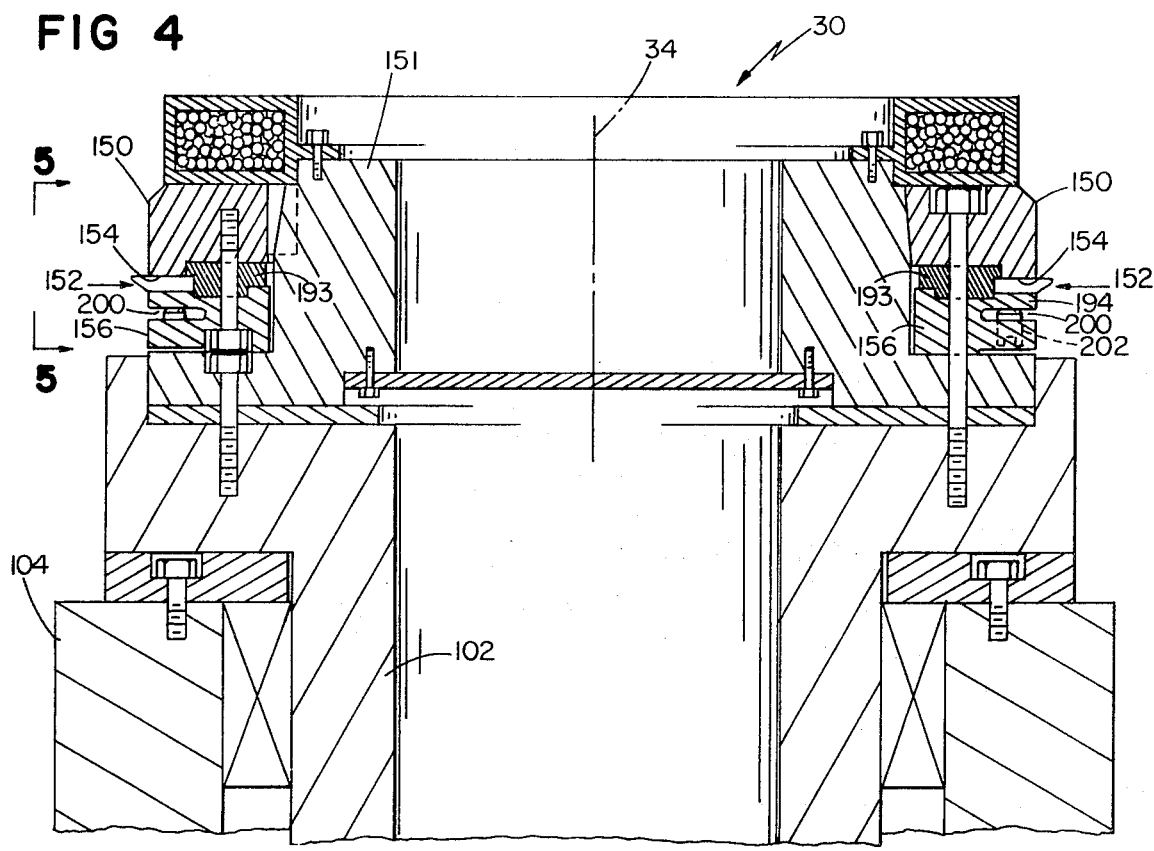
Figure 2:
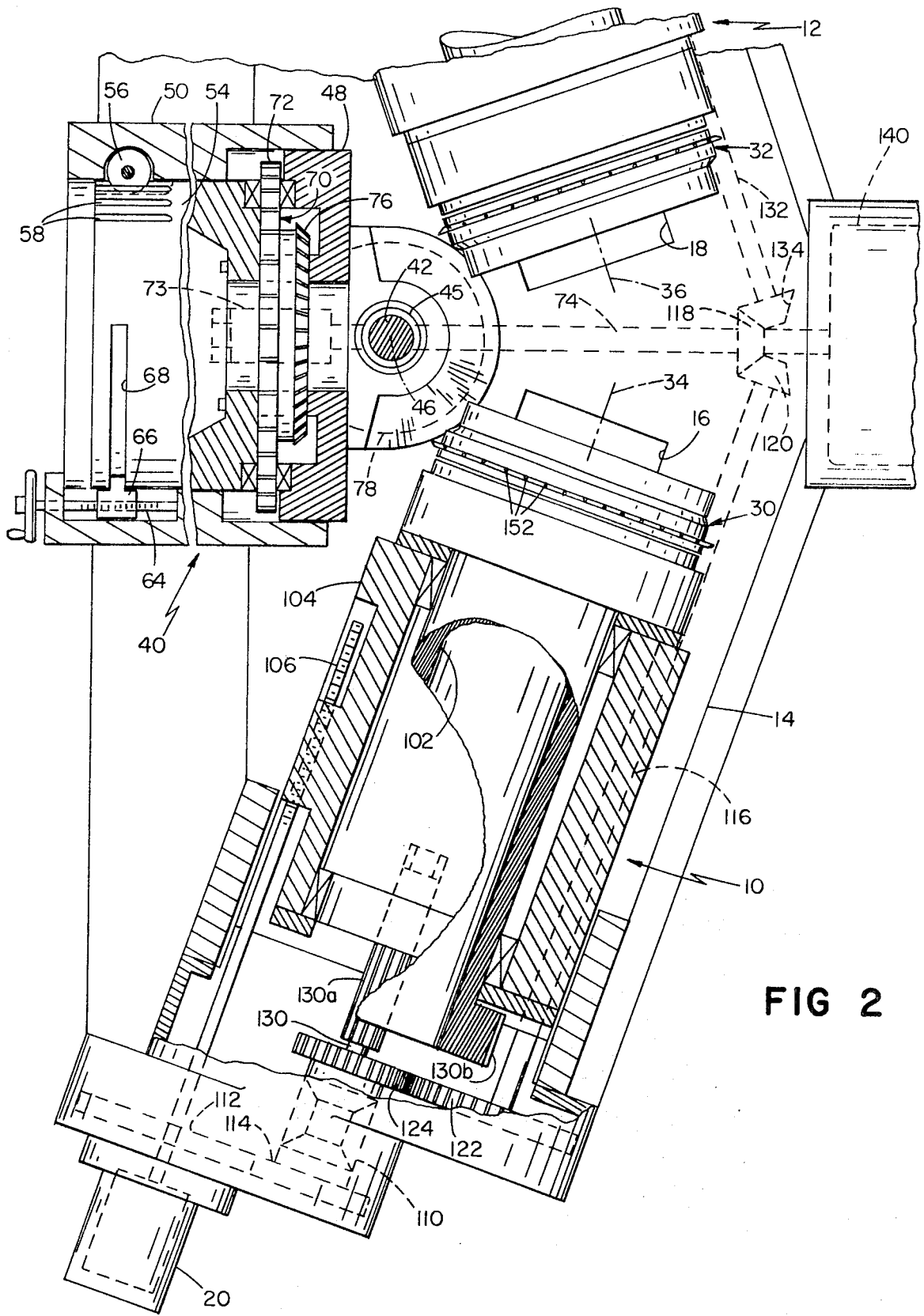
Figure 11:
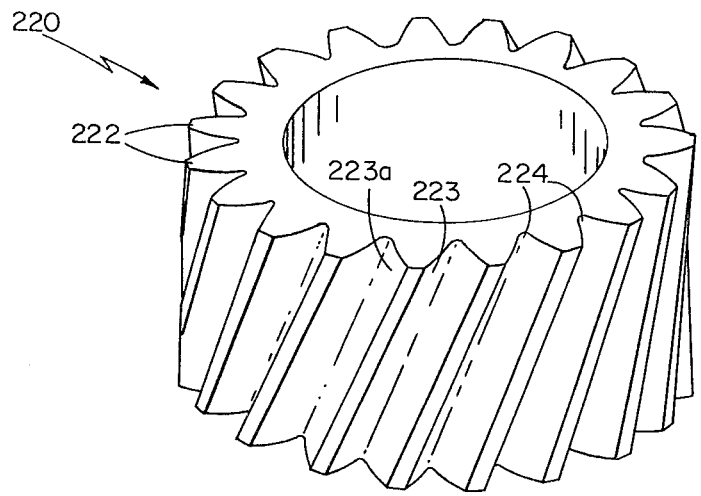
Figure 12:
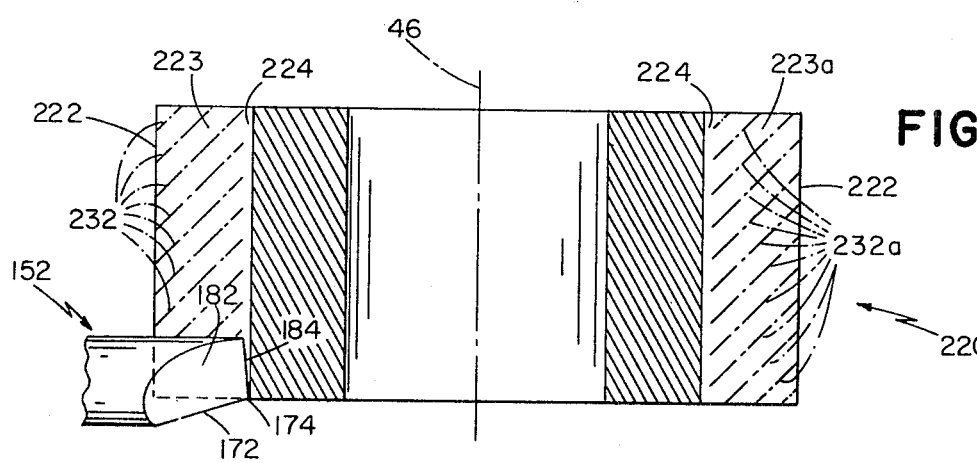
Figure 13:
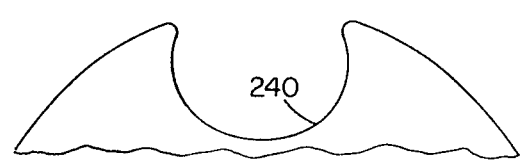
Figure 14:
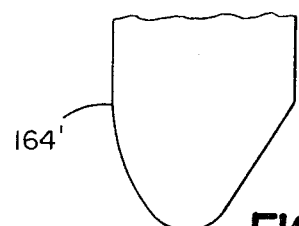
Figure 5A:
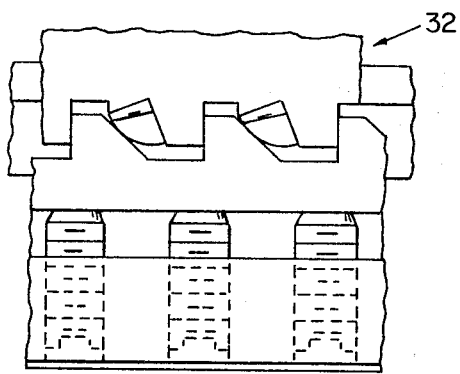

Other objects, features, and advantages will appear from the following description of a preferred embodiment of the invention, taken together with the attached semi-schematic drawings thereof, in which:

FIG. 1 is an isometric view of a gear making machine;
FIG. 2 is a fragmentary plan view, partially broken away and sectioned, of the machine of FIG. 1;
FIG. 3 is a fragmentary elevational view of the workpiece support portion of the machine;
FIG. 4 is an axial section of a portion of a cutter;
FIG. 5 is a fragmentary elevational view taken along 5—5 of FIG. 4;
FIG. 5a is a view similar to FIG. 5 of a smaller portion of the other cutter;
FIG. 6 is a sectional view taken along 6—6 of FIG. 5;
FIG. 7 is an end view of one tool;
FIG. 8 is a view along 8—8 of FIG. 7;
FIG. 9 is a view along 9—9 of FIG. 7;
FIG. 10 is an isometric view of a tool;
FIG. 11 is an isometric view of a gear to be made;
FIG. 12 is a diagramatic axial section of a workpiece, shown in conventional fashion as a spur gear, showing selected lines along which successive tools make cuts tangent to the desired profile during the axial feed mode;
FIG. 13 is a plan view of a non-involute profile; and
FIG. 14 is a plan view of a profile generating cutting edge useful for generating the profile of FIG. 13.

Two cutter assemblies 10 and 12 (FIGS. 1, 2) are mounted on machine frame 14 for sliding linear movement in grooves 16 and 18, respectively, under the power of motors 20 and 22. The cutter assemblies include cutters 30 and 32 mounted to rotate about coplanar axes 34 and 36 respectively parallel to the directions of grooves 16 and 18 making an obtuse angle with each other.

Work support assembly 40 also mounted on frame 14 includes a pair of work support spindles 42 and 44 rotatable about a common axis 46. Spindles 42 and 44 carry between themselves a workpiece 45 and are positioned on a head 48 mounted for angular adjustment in housing 50, so that the angle between axis 46 and axes 34 and 36 can be changed. Head 48 is bolted to cylindrical sleeve 54 in housing 50. Worm 56 meshes with grooves 58, so that rotation of the worm (under control of handle 60, FIG. 1) causes corresponding rotation of the sleeve. Screw 64 is journalled in housing 50 and engages threads in a bore in block 66 keyed in circumferential groove 68 of sleeve 54, so that rotation of screw 64 causes movement of sleeve 54 along its own axis.

Mounted to rotate between head 48 and sleeve 54 is ring 70 (FIGS. 2-3) one portion of which is a spur gear 72 in mesh with drive gear 73 on shaft 74, another portion of which is a bevel gear 76 in mesh with a bevel gear 78 surrounding spindle 44. Gear 78 has an inner projection 80 which fits in helical groove 82 in spindle 44. Spindle 44 has a counterbore 90, and, with cylindrical post 92 of head 48, provides a hydraulic cylinder controlled by fluid fed through passage 94 in the head.

Spindle 42 is mounted for rotary and axial movement in head 48, and is biased toward spindle 44 by spring 96.

Cutter 30 (FIGS. 2–4) is carried on spindle 102 for rotation in housing 104. Motor 20 drives shaft 106 threaded in housing 104 to move the housing in groove 16. Shaft 106 is coupled to one input of differential 110 through gears 112 and 114. Shaft 116, driven by shaft 74 through bevel gears 118 and 120, is coupled to the other input of differential 110 through gears 122 and 124. The differential sums the rotations of shafts 106 and 116, and drives, through its output, shaft 130 which is arranged to rotate spindle 102 through gears 130a and 130b, while allowing axial movement of the spindle when shaft 106 rotates.

Cutter assembly 12 is similarly constructed and driven, with shaft 132 driven through bevel gears 118 and 134 providing one input to the corresponding differential (not shown). The differential is arranged to subtract from the rate of rotation of shaft 132 the rate of rotation of the shaft (not shown) corresponding to shaft 106.

Shaft 74 is driven by motor 140.

Cutter 30 has a head 150 (FIGS. 4–6) bolted on spindle extension 151 with a carbide tool 152 clamped in each of a series of radial recesses 154 equally spaced around the head. The tools are held in place by clamping ring 156 bolted to head 150.

Each tool 152 (FIGS. 7–10) has a pair of flat surfaces 160 and 162 meeting at an acute angle to define straight-line profile generating cutting edge 164, and a cylindrically rounded surface 166. At the cutting end 168 of the tool surface 160 acts as a leading face 170 bounded by edge 164, concave roughing edge 172, and cutting tip 174 having a radius of curvature matching that of the fillet of the gear to be made. Face 170 is tilted at a small clearance angle relative to an imaginary reference plane 180 (FIG. 10), and the side and tip surfaces 162, 182, and 184 all slope away from face 170 at small clearance angles to planes normal to reference plane 180, as indicated in FIG. 10.

Each groove 154 in head 150 has a V-shaped portion with surfaces 190 and 192 at an angle to each other equal to the angle between tool surfaces 160 and 162, so that the tool will fit tightly into the groove with the surfaces defining edge 164 directly positioned by contact with the head. The tools are radially located by abutment against positioning ring 193 (FIG. 4). Clamping ring 156 has a tooth 194 (FIG. 5) which extends into rectangular portion 196 of each groove 154, with oblique surface 198 against surface 166 of the tool. Ring 156 has a circumferential slot 200 below teeth 194, across which pass tightening bolts 202 (one for each pair of tools). The tools are firmly clamped in place by turning bolts 202 to force tool surfaces 160 and 162 against head surfaces 190 and 192, respectively. Thus, edges 164 are always located in the same position, even after repeated sharpenings by grinding of surfaces 160 and 162.

Groove surfaces 190 and 192 are located so that all tool edges 164 lie in a single plane perpendicular to the cutter axis, and all reference planes 180 are at an angle to cutter axis 34 dependent upon the desired helix angle of the gear being made (taken at the generating circle of the gear) and the angle between axes 34 and 46.

Cutter 32 (FIG. 5a) is similarly constructed, with its tools being mirror images of tools 152. The corresponding reference planes of the tools of cutter 32 are tilted with respect to axis 36 in the opposite direction (from the point of view of an observer watching a tool from each cutter simultaneously passing through the workpiece) from the direction in which the reference planes of tools 152 are tilted with respect to axis 34. The leading faces of all tools face workpiece 45 as they approach the workpiece from above when the cutters are rotating in the directions indicated in FIG. 1.

The ratio of the common rate of rotation of cutters 30 and 32 (taken when the cutter assemblies are stationary in their slots and the workpiece is not moving along axis 46) to the rate of rotation of spindle 44 is equal to the ratio of the desired number of teeth in the gear being made to the number of tools per cutter.

The lead of helical groove 82 in spindle 44 is equal to the lead of the gear being made.

Differential 110, and the corresponding differential for cutter 32, are chosen so that the differential rate of rotation added to a cutter upon translation of the cutter assembly along its slot is related to the rate of that translation in a manner appropriate to the desired gear tooth profile being generated (e.g., the differential rate of cutter rotation being linearly related to the rate of cutter translation when involute profiles are being generated).

Operation of the above described apparatus, to make from a workpiece 45 a gear 220 (FIG. 11) having teeth 222 with involute tooth profiles 223 and 223a on their respectively opposite sides, and fillets 224, consists of an infeed of the cutters to the desired root depth, followed by an axial feed of the workpiece.

Involute generation involves, of course, an effective relative rolling motion between cutter and workpiece, and, in machines of this general type, all generation occurs at the intersection of the plane of action (tangent to the base circle) with the path through which the cutting edges move. Prior to the infeed the rotating cutters are spaced from the workpiece, with spindles 42 and 44 lowered (from the point of view of FIG. 1) so that the plane of action will not intersect the cutters within the workpiece during the infeed. Handle 60 is adjusted so that axis 46 is tilted with respect to each cutter axis by an angle which differs from 90° by an angle other than the helix angle of the gear being made (taken at the generating circle), making use of the formulas set forth above. With motor 140 operating, motors 20 and 22 are actuated to advance cutter assemblies 10 and 12 along slots 16 and 18 toward the workpiece. The tools will begin to remove stock from the top of the workpiece adjacent to, but not intersecting, the desired tooth profiles. Considering the action of cutter 30 as typical, one tool 152 will make a small notch at the top of the workpiece adjacent one tool position, the next tool will cut a corresponding notch adjacent the very next tooth position, and so on, so that a corresponding notch will be cut on the corresponding side of each tooth before a second cut is made on the same side of the first tooth. As screw 106 turns, translating the cutter, a differential rotation proportional to that translation is added to the basic rotation of the cutter, through differential 110. The linear advance and differential rotation of the cutter constitute an effective relative rolling motion between the workpiece and the cutter and cause the successively deeper passes by tool edges 164 adjacent any given tooth to be tangent to the imaginary continuation above the workpiece of the desired involute profile 223, the lines of tangency being oblique to the workpiece axis and successively approaching the desired root circle of gear 220. This imaginary tangency above the workpiece ensures that the cuts will not intersect the desired profiles within the workpiece. The infeed is continued to the desired depth.

At the end of the infeed motors 20 and 22 are stopped, and fluid is forced through passage 94 to gradually raise spindles 44 and 42 and the workpiece. The tools of each cutter will continue to, in effect, mesh with the emerging teeth of the workpiece, and to make successive oblique cuts in each toothspace identical to each other except for their axial position on the workpiece. As the plane of action within the gear intersects the profile generating edges, involute profiles will be generated by cuts along oblique lines extending, after the early cuts which do not reach the fillet, from fillet to tip of each tooth. Projection 80 and groove 82 give the workpiece an extra rotation related to the axial feed of the workpiece to produce the desired lead in gear 220. The involute profile is generated during the axial feed by virtue of the fact that each cut removes stock at every radial (of the workpiece) position along the desired profile, along a path that is tangent to the profile because of the linear nature of the profile generating tool edges and the constant ratio of the respective rates of cutter and workpiece rotation. The axial feed continues until the desired profiles have been generated across the entire face width of the gear, the total length of axial feed being greater than the face width, as is required to finish all corners of the profiles. Selected lines 232 tangent to the profile, taken from the sequence of successive cuts during the axial feed, are shown in FIG. 12, for a typical profile 223.

Tool tips 174 will cut the tooth fillets, which will be straight despite the fact that the tools move through an arc, since the entire workpiece will have been fed axially past the plane of deepest tool penetration, that plane being defined by and including the cutter axis and the common normal to the cutter and workpiece axes. Tool edges 172 rough out material in the paths of the tools of cutter 32.

Cutter 32 operates in generally the same way as cutter 30, to generate profiles 223a. During the infeed the differential cutter rotation proportional to the cutter feed is subtracted from the basic rate of cutter rotation. Since the top of the workpiece is tilted away from cutter 32, the cut lines 232a which generate the involute slope downwardly toward fillets 224.

The infeed portion of the generating cycle described above can be omitted by advancing the cutters to the position where the tools sweep to the desired depth while the workpiece is lowered sufficiently to be completely out of the paths of the tools. Exclusive use of axial feed can be particularly advantageous in generation of non-involute profiles, and especially concave (i.e., undercut) profiles, since, for axial feed, the generating motion from root to tip of the profile occurs, and in essentially identical fashion, during each cut, and can be controlled completely by the geometry of the profile generating tool edges 164. Thus, the tool edge needed to generate the desired non-involute profile can be derived from the profile geometry by conventional graphical convergent techniques, using successive cutting trials, and corresponding tool re-design, to gradually arrive at the optimum generating edge. FIG. 14 shows a tool with a cutting edge 164' useful for generating the profiles 240 shown in FIG. 13.

If the apparatus is operated in its infeed mode with the cutter axes perpendicular to the workpiece axis, and with the workpiece raised so that the profile generating cutting edges intersect the plane of action across the entire workpiece facewidth, involute profiles will be completely generated during the infeed in the manner described in detail in the above identified pending application.

Other embodiments will appear to those skilled in the art and are within the following claims.

What is claimed is:

1. Apparatus for generating tooth profiles in a gear, comprising
   a workpiece support,
   means mounting said support for rotation of a workpiece about an axis at a basic rate;
   a cutter having profile generating cutting edges lying along straight lines and,
   means mounting said cutter for rotation about a cutter axis at a basic rate bearing a ratio to the basic workpiece rate dependent upon the ratio of the number of said profiles being generated to the number of said profile generating cutting edges in said cutter,
   said cutter axis being out of perpendicularity with the workpiece axis by an angle other than the helix angle of said gear taken at the generating circle,
   means mounting said cutter and said support for relative translation axially of said workpiece; and
   means responsive to said relative translation to add to or subtract from one of said basic rates a differential rate of rotation to which the rate of said translation bears a ratio dependent upon the desired lead of said gear;
   whereby successive cuts made in each toothspace are tangent to the adjacent desired profile at lines oblique to said workpiece axis and extending generally between the fillet and tip of said profile, and between successive cuts tangent to any one desired profile there will intervene a complete revolution of said workpiece.

2. Apparatus for generating tooth profiles in a gear, comprising
   a workpiece support
   means mounting said support for rotation of a workpiece about an axis at a basic rate;
   a pair of cutters each having profile generating cutting edges
   means mounting said cutters for rotation about a respective cutter axis at a basic rate bearing a ratio to the basic workpiece rate dependent upon the ratio of the number of said profiles being generated to the number of said profile generating cutting edges in a said cutter,
   means mounting said cutters and said support for relative translation axially of said workpiece; and
   means responsive to said relative translation to add to or subtract from one of said basic rates a differential rate of rotation to which the rate of said translation bears a ratio dependent upon the desired lead of said gear;
   whereby successive cuts made in each toothspace are tangent to the adjacent desired profile at lines extending generally between the fillet and tip of said profile, and between successive cuts tangent to any one desired profile there will intervene a complete revolution of said workpiece,
   said cutters being arranged to generate respective profiles on the opposite sides of teeth of said gear.

3. The apparatus of claim 1 wherein said profile generating cutting edges lie on a single surface of revolution.

4. The apparatus of claim 2 wherein said profile generating cutting edges are non-linear, and said profiles are non-involute.

5. The apparatus of claim 1 wherein said cutter has a tool-holding body with removable tools arranged so that said profile generating cutting edges are spaced uniformly around the periphery of said body.

6. The apparatus of claim 1 further comprising a second cutter constructed and disposed in a manner analagous to said first mentioned cutter for generating profiles on the opposite sides of teeth from said profiles generated by said first mentioned cutter.

7. The apparatus of claim 6 wherein the two cutter axes are non-parallel to each other and means mounting said cutters provide for translation along their respective axes toward said workpiece axis, in addition to said relative translation.

8. The apparatus of claim 7 wherein said cutter axes are coplanar.

9. The apparatus of claim 1 wherein said means mounting said cutter and said support additionally provide for relative translation along a path non-parallel to said workpiece axis, one of said basic rates of rotation being changed, upon occurrence of said last mentioned relative translation, by a differential rate dependent upon the rate of said last mentioned translation, so that for each desired tooth profile said profile generating cutting edges will make a series of passes respectively tangent to an imaginary continuation above said workpiece of said desired profile along a series of lines, said support and said cutter being relatively positioned so that, during said last mentioned translation, said cutter does not intersect the surface of action on which are located said lines oblique to said workpiece axis, a complete revolution of said workpiece intervening between successive ones of said sweeps tangent to any one said imaginary continuation of a desired profile.

10. The apparatus of claim 9 wherein only said relative translation non-parallel to said workpiece axis occurs during an infeed mode, and only said relative translation axially of said workpiece occurs during an axial feed mode subsequent to said infeed mode.

11. The apparatus of claim 1 wherein said cutter rotates to a plane of deepest penetration into said workpiece, said plane being defined by and including said cutter axis and the common normal to said cutter and workpiece axes, said relative translation extending sufficiently to cause the entire said workpiece to effectively move axially past said plane.

12. The apparatus of claim 2 wherein the two cutter axes are non-parallel to each other and means mounting said cutters provide for translation along their respective axes toward said workpiece axis, in addition to said relative translation.

13. The apparatus of claim 2 wherein said cutter axes are coplanar.

14. Apparatus for generating tooth profiles in a gear, comprising
   a workpiece support
   means mounting said support for rotation of a workpiece about an axis at a basic rate;
   a cutter having profile generating cutting edges, means mounting said cutter for rotation about a cutter axis at a basic rate bearing a ratio to the basic workpiece rate dependent upon the ratio of the number of said profiles being generated to the number of said profile generating cutting edges in said cutter,
   means mounting said cutter and said support for relative translation axially of said work piece; and means responsive to said relative translation to add to or subtract from one of said basic rates a differential rate of rotation to which the rate of said translation bears a ratio dependent upon the desired lead of said gear;

whereby successive cuts made in each toothspace are tangent to the adjacent desired profile at lines extending generally between the fillet and tip of said profile, and between successive cuts tangent to any one desired profile there will intervene a complete revolution of said workpiece, said means mounting said cutter and said support providing additionally for relative translation along a path non-parallel to said workpiece axis, said basic rate of rotation of said cutter or of said workpiece being changed, upon occurrence of said last mentioned relative translation, by a differential rate dependent upon the rate of said last mentioned translation, so that for each desired tooth profile said profile generating cutting edges will make a series of passes respectively tangent to an imaginary continuation above said workpiece of said desired profile along a series of lines, said support and said cutter being relatively positioned so that, during said last mentioned translation, said cutter does not intersect the surface of action on which are located said lines at which said cuts are tangent to said desired profiles, a complete revolution of said workpiece intervening between successive ones of said sweeps tangent to any one said imaginary continuation of a desired profile.

15. The apparatus of claim 14 wherein only said relative translation non-parallel to said workpiece axis occurs during an infeed mode, and only said relative translation axially of said workpiece occurs during an axial feed mode subsequent to said infeed mode.

* * * * *